O. OHLSON.
FLEXIBLE SHAFT OR CHAIN.
APPLICATION FILED JAN. 9, 1915.
1,146,015.
Patented July 13, 1915.
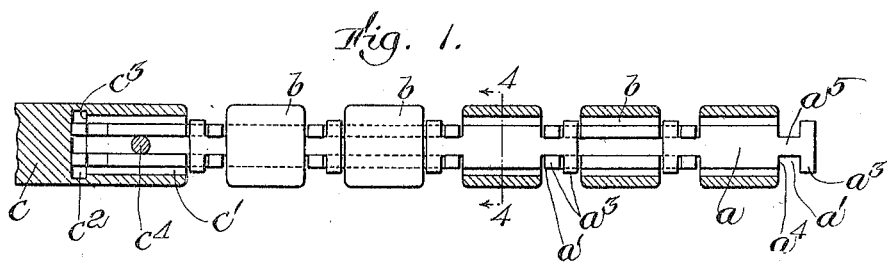
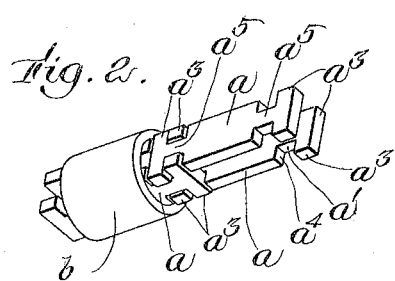
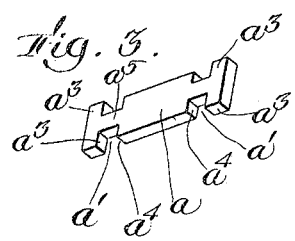
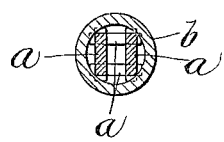
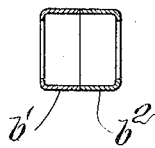
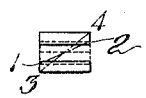
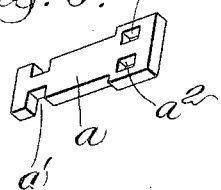
Witnesses:
Inventor:
Olof Ohlson,
by
Attorneys.

UNITED STATES PATENT OFFICE.

OLOF OHLSON, OF WEST NEWTON, MASSACHUSETTS.

FLEXIBLE SHAFT OR CHAIN.

1,146,015. Specification of Letters Patent. Patented July 13, 1915.

Application filed January 9, 1915. Serial No. 1,429.

*To all whom it may concern:*

Be it known that I, OLOF OHLSON, a citizen of the United States, and resident of West Newton, in the county of Middlesex and State of Massachusetts, have invented certain new and useful Improvements in Flexible Shafts or Chains, of which the following is a specification.

The present invention relates to a novel construction adapted to be used for the purposes of a flexible shaft in transmitting power by rotation, and also for the purposes of a chain in transmitting power by a longitudinal pull.

The objects of the invention have been to produce a simple and inexpensive form of flexible shaft or chain which is susceptible of being curved or bent out of a straight line to at least as great an extent as the commonly used flexible shafts may be bent, and which when so bent is adapted to transmit force rotatably positively and without appreciable internal friction; also to produce a contrivance in the nature of a chain capable of being made in any length and the links or elements of which can be quickly assembled and securely connected together, without riveting or welding.

As the contrivance in which the invention is embodied is adapted to serve the various purposes of both a flexible shaft and a chain, it may be properly designated either as a chain or as a flexible shaft, or by both names, but for the purposes of the present description, it will be called in the following description by the term "chain" only, it being understood that this term is used simply for the convenience of description and without limiting significance.

In the drawings, Figure 1 represents a fragment of a chain made in accordance with my invention, and being shown partly in elevation and partly in longitudinal section. Fig. 2 is a perspective view of two of the links of which the chain is composed, one of the links being complete and the other being without its binding member. Fig. 3 is a perspective view of one of the bars which forms a component of the links. Fig. 4 is a cross section on line 4—4 of Fig. 1. Fig. 5 is a perspective view of a modified form of link element. Fig. 6 is a sectional view of a modified form of binder. Fig. 7 is an end view of two of the bars which constitute a link, showing such bars in their normal assembled relation, and also by dotted lines, in the position assumed for assembling with the binder.

The same reference characters indicate the same parts in all the figures.

Each link of the chain in which my invention is embodied is composed of two elements $a$, which for the purposes of the present description I may call "bars," and a sleeve or hollow cylinder $b$, which for the same purposes may be called a "binder." Each bar $a$ has two recesses $a'$ in each of its opposite sides, said recesses being near the opposite ends, respectively, of the bar. In the form of bar shown in Figs. 1, 2, and 3 the recesses $a'$ have the form of notches open at the edges of the bar, while in the form shown in Fig. 5 the two recesses $a^2$ at one end are entirely inclosed by the material of the bar while the two recesses $a'$ at the opposite end are open, as above described. The stock of the bar, at each side of the recesses $a'$ forms shoulders $a^3$, $a^4$, the shoulders $a^3$ being at the extreme ends of the bar and having the form of lateral projections. Said shoulders or projections $a^3$ extend laterally somewhat beyond the edges of the central part of the bar, for a purpose presently to be described, and in width, that is in the dimension longitudinally of the bar, are somewhat less than the width, or dimension in the same direction, of the notches. The depth of the notches is substantially equal to the thickness of the stock from which the bar is made. The material employed in making the bars is necessarily such as will give the required strength and compactness, and ordinarily metal is essential. The particular metal is chosen with regard to the size and strength required for the chain. Preferably for chains used as flexible shafting, I would make the bars out of soft steel and case-harden, to combine strength and wearing qualities and low friction. Other metals may be used where their respective qualities are desirable for strength or ornament.

The bars are assembled to form links and are connected with other links in the manner shown in Fig. 2. Two of the bars are held parallel to one another at a distance apart approximately equal to the width of the neck $a^5$ between the notches at the end of the bar. Then two other bars are interlocked with the first two bars by placing them so that the notches at one end of each receive one of the interlocking projections $a^3$ of each of the first two bars, and the two projections at one end of each of the second bars are contained in the corresponding notches at one end of each of the first bars. In other words, each of the bars receives one of the lateral projections $a^3$ of another bar in each one of its recesses, and each locking projection $a^3$ of each bar is also contained in a recess of one of the other bars. Then the retaining sleeve or binder $b$ is slipped over the ends of the bars last assembled, a third pair of bars is assembled as above described with the link just completed, the binder sleeve is slipped over these bars to complete the third link and the construction is carried on in this manner until a chain of the desired length is formed. The endmost link or pair of bars is permanently secured in an end binder or coupling $c$, which may be a shaft section, or a bar of any description, and which has an opening $c'$ formed at one end. The opening or recess $c'$ is enlarged at its inner end to form a chamber $c^2$, such enlargement or chamber being bounded by a shoulder $c^3$, which has a function in securing the link in the binder. A pin $c^4$ is driven through the binder $c$ between the bars of the endmost link and spreads the inner ends of such bars apart, so that the ends of their lateral projections $a^3$ are interlocked with the shoulder $c^3$. The bore of each binder sleeve, at least at the ends of such sleeve, is of such a diameter that the lateral projections $a^3$ of two bars may be passed through it when the ends of the bars are brought into contact with one another. In other words, assuming that the ends of two link bars are laid together as shown by the dotted lines in Fig. 7, then the diameter of such bore must be enough larger than the diagonal 1—2 to enable the link to be slipped through the binder. But this diameter is less than the diagonal 3—4 between the outer corners of the relatively opposite lateral projections of the two bars when the bars are separated in their normal position. The central parts of the bars are enough narrower than the ends to permit the bars to be separated the required distance to be interlocked with the bars of the adjacent links, as is shown by the sectional view Fig. 4. Thus after a binder sleeve has been slipped over a link, and the bars of the link have been spread apart far enough to interlock with the adjacent links, the sleeve is held in place by the ends of the adjacent links, the outer corners of which extend across the inner edge of the sleeve end. The end opening in the shaft or coupling member $c$ is of approximately the same diameter, whereby a link may be inserted therein when the ends of the bars forming such link are brought together, and the shoulders $a^3$ at such ends overlap the shoulder $a^2$ within the coupling when the bars are spread apart. Thus the introduction of the pin $c^4$ which spreads these bars apart causes them to be securely interlocked with the shoulder $c^2$ of the coupling member. There is enough play or lost motion between the boundaries of the slots in the bars and the lateral projections which lie in these bars to permit of the links being inclined to one another, whereby the assembled chain or shaft may be curved or bent out of a straight line.

When the chain is used as a shaft to transmit rotation and is bent thus out of a straight line, the locking projections play back and forth in the recesses wherein they are contained. I have found that even when power is transmitted against great resistance there is practically no binding between the locking shoulders and sides of the link bars, and the frictional resistance to the play above referred to is so slight as to be negligible.

The binder sleeves perform the double function of holding the bars of each link together and of providing a smooth bearing surface when the device is used as a shaft within a housing or casing. These sleeves may be casehardened and polished, whereby their outer surfaces are made strongly wear-resisting and produce very little friction.

Fig. 6 shows a construction of the binding sleeve wherein the sleeve is made of two parts $b'$ and $b^2$ pressed or spun from annular disks of sheet metal. The sleeves $d$ shown in the other figures may be made in any way desired, as by boring out and cutting off sections of metal rods, or by cutting off sections of tubing, or otherwise.

What I claim and desire to secure by Letters Patent is:

1. A chain for flexible shafts composed of interengaged links, each link comprising flat bars having notches in opposite sides near each end, and being arranged side by side in parallel planes and interlocked with bars similarly formed and arranged except that they are located in planes at right angles to those of the first named bars, and means for retaining said bars in interlocked relation.

2. A chain constructed of links, each link comprising two similar bars and a binder surrounding said bars, the bars each having notches in its opposite sides near the opposite ends thereof, and being arranged beside one another in parallel planes, each pair of adjacent notches of the two bars containing the end portions of one of two other and similarly constructed link bars.

3. A chain comprising a series of interlocked link bars, each bar having a recess at each side near each end thereof and said bars being interlocked with one another by engagement of the lateral projections between each notch and the end of each bar with the notches of adjacent bars, and means for holding said bars in such interlocked engagement.

4. In a chain, a link comprising two similar bars having notches in their opposite sides near their ends, and a sleeve substantially equal in length to the distance between the innermost edges of such notches and having an internal diameter large enough to receive two of said bars in parallel separated by an intermediate space.

5. A link element for a chain comprising a bar having recesses in opposite sides adjacent to each of its ends.

6. A link element for a chain comprising a bar having recesses in opposite sides adjacent to each of its ends, the width of the bar between the notches being less than its width at the ends.

7. A link element for a chain of the character described comprising a bar having two recesses in each of its sides near its ends, said recesses being greater in their dimensions longitudinally of the bar than the width of the material between the notches and the extreme ends of the bar.

8. A link element for a chain of the sort described comprising a bar having greater width than thickness, said bar having notches exactly opposite to each other in its opposite edges and near its ends, said notches being wider (in the longitudinal direction of the bar) than the width of the material lying between the end of the bar and the adjacent notches, and extending inwardly from the edges of the material between the notches a distance approximately equal to the thickness of the bar.

9. A chain comprising notched bars interlocked in pairs, each bar having lateral projections on each side of each end and recesses on each side beside said projections, the lateral projections on the one end of each bar being contained in the notches in the corresponding sides at the adjacent ends of the adjacent bars, and the bars of each pair being separated by the width of the stock between the notches at the opposite sides of the interposed bar, and binding means surrounding each pair of bars and limiting the separation of the members of such pair.

10. A chain comprising notched bars interlocked in pairs, each bar having lateral projections on each side of each end and recesses on each side beside said projections; the lateral projections on the one end of each bar being contained in the notches in the corresponding sides at the adjacent ends of the adjacent bars, and the bars of each pair being separated by the width of the stock between the notches at the opposite sides of the interposed bar, and binding means surrounding each pair of bars and limiting the separation of the members of such pair, said binding means being contained between, and of less lateral extent than, the ends of the bars which are interlocked with the bars surrounded by said means.

11. A flexible shaft or chain consisting of a coupling member having a recess entering one end thereof and an enlarged chamber at the inner end of said recess, link bars contained in said recess and disposed on opposite sides of the longitudinal center thereof, said bars having lateral projections projecting into said chamber laterally beyond the walls of the recess, a spreader secured between the bars holding the latter apart, said bars protruding from the end of said coupling member and having recesses in opposite sides near their protruding ends, a link composed of bars arranged between the ends of such protruding ends and each having oppositely extending lateral projections contained in the recesses of both the first named bars, and having recesses containing the parts of the first named bars which lie outside of the recesses therein, and a binder surrounding the bars of said link to prevent disengagement thereof from the first named bars, the bars of the link also having recesses in opposite sides near their ends; and a succession of similarly constituted links similarly engaged with the above described link and with one another.

12. A coupling member for the end of a chain or shaft of the character described, having a recess or bore adapted to contain and confine a pair of spaced-apart link bars and having an enlarged chamber within such recess adapted to contain lateral projections on the ends of such bars.

In testimony whereof I have affixed my signature, in presence of two witnesses.

OLOF OHLSON.

Witnesses:
ANDERS AUNE,
EUGENE L. FOLSOM.

Copies of this patent may be obtained for five cents each, by addressing the "Commissioner of Patents, Washington, D. C."